Patented May 11, 1954

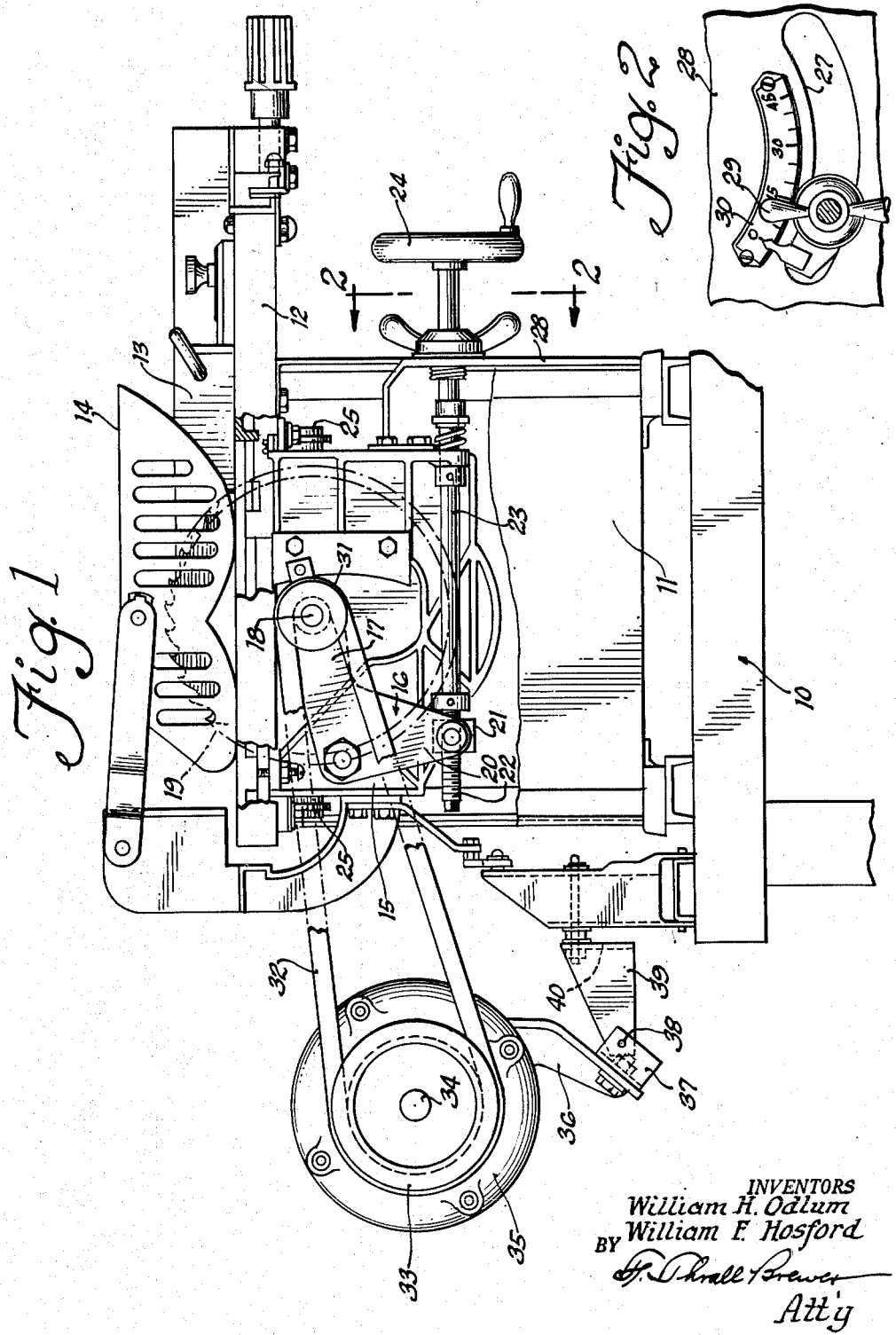

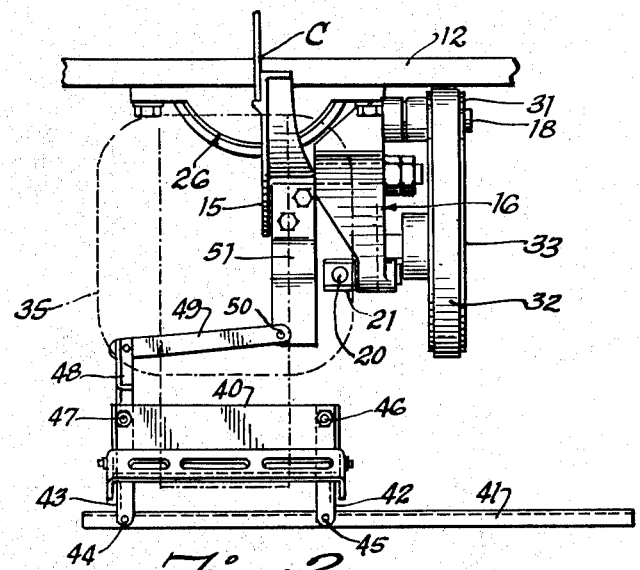
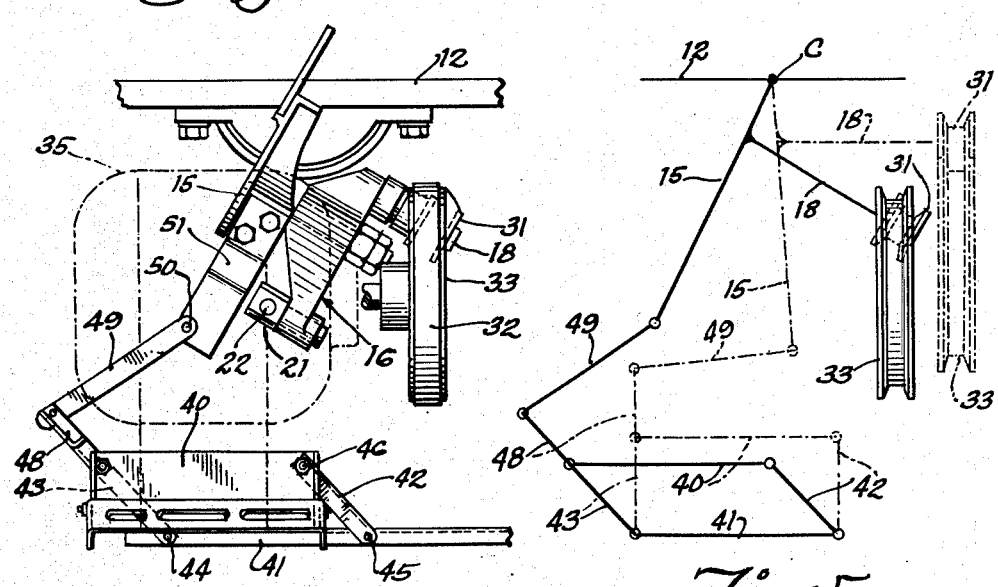
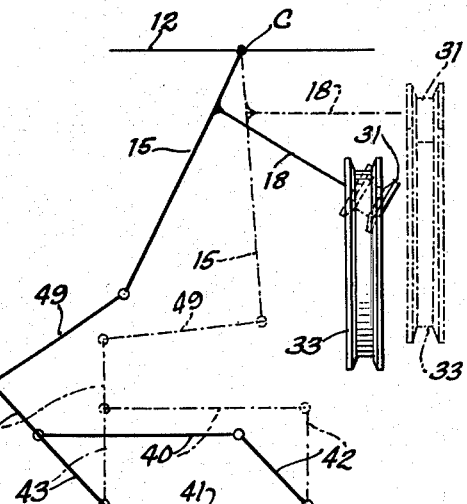

2,678,071

UNITED STATES PATENT OFFICE 2,678,071

MOTOR MOUNTING AND DRIVE MEANS FOR POWER TOOLS

William H. Odlum, Wilmette, and William F. Hosford, Chicago, Ill., assignors to Duro Metal Products Co., Chicago, Ill., a corporation of Illinois Application February 6, 1953, Serial No. 335,548

7 Claims. (Cl. 143—36)

This invention relates to a motor mounting and drive means for power tools such as table saws and the like wherein the tool is adapted to be tilted relative to the table in addition to being provided with means for regulating the depth of the cut taken by the tool.

In the application, Serial No. 194,149, filed November 4, 1950 by Theophil A. Hess, and issued January 27, 1953 as Patent No. 2,626,639, assigned to the same assignee as is this application, there is described and claimed a belt drive for a power tool having a tool the axis of rotation of which may be tilted relative to the axis of the drive motor as well as translated with respect thereto. The axis of the drive motor, however, is limited to a parallel translating movement without any provision for endwise movement. The tilting movement of the tool axis is compensated for by providing a wide drive pulley on which the belt may shift its position to accommodate the endwise component of the movement of the tool axis.

Although the wide pulley has the advantage of simplicity of operation, particularly as to the motor mounting, there are some instances where the desirability of using a standard drive pulley instead of a rather special wide pulley outweighs the advantage of simplicity and the principal object of this invention therefore is to provide a belt drive for a power tool or the like wherein the axis of rotation of the driven tool may be tilted as well as translated, and wherein the drive pulley is a standard single-width pulley.

More specifically, the object of this invention is to provide a means for moving a drive motor of a power tool endwise of its axis of rotation in unison with the endwise component of movement of a tool driven by the motor when the axis of rotation of said tool is tilted with respect to the motor axis, to maintain the drive side of the pulleys on the tool and motor in substantial alignment.

It is also an object of this invention to provide a means for moving a drive motor of a power tool endwise of its axis of rotation in unison with the endwise component of movement of the tool driven by the motor without in any way impairing the normal and expected functions and adjustments of the tool and without requiring a major re-design of a power tool such as that described in the aforesaid patent.

These and other objects and features of our invention will become apparent from the following detailed description when taken together with the accompanying drawings in which:

Fig. 1 is a side elevation, partly cut away, of a table saw to which a preferred embodiment of this invention has been applied;

Fig. 2 is a fragmentary front elevation of a control for the saw of Fig. 1, taken along line 2—2 of Fig. 1;

Fig. 3 is a fragmentary rear elevation on a somewhat reduced scale of the motor mounting and drive for the table saw of Fig. 1, showing the saw in a vertical position;

Fig. 4 is an elevation similar to that of Fig. 3, showing the saw and associated drive mechanism when the saw is tilted with reference to its table; and Fig. 5 is a kinematic diagram of the links used in the mounting and drive of Fig. 4.

Referring now to the drawings for a detailed description of the invention, and particularly to Fig. 1, there is shown a supporting stand 10 for the table saw to which is secured the frame 11 of the table saw on which is mounted the table 12 for the work pieces to be cut. The usual guide or "fence" 13 and guard 14 are provided above table 12.

Below table 12 is a plate 15 having mounted thereon a bell crank 16 on one arm 17 of which is mounted a shaft 18 for driving a circular saw 19 and on the other arm 20 of which is pivotally secured an adjusting nut 21 operating upon the threaded end 22 of a shaft 23. Said shaft 23 is likewise mounted on plate 15 and extends to the right, as viewed in Fig. 1, to terminate in a hand wheel 24 by which said shaft is rotated. Turning of bell crank 16 is effected by turning hand wheel 24, either clockwise or counter-clockwise, as the case may be, and the turning of bell crank 16 clockwise or counter-clockwise lowers or raises saw 19 with reference to table 12.

Plate 15 is supported from table 12 through spaced guides 25, 25 having circular ways 26 (Fig. 3) the center of curvature of which is at C (Fig. 3). The movement of plate 15 in ways 26 permits a tilting of saw 19 relative to table 12 to enable the operator to make angular cuts in the work piece. The tilting of saw 19 obviously tilts shaft 18 also and displaces bell crank 16, shaft 23 and handle 24 along a circular arc. This arc is shown in Fig. 2 as a slot 27 in the front wall 28 of frame 11. Shaft 23 and its associated mechanisms may be clamped at any point along slot 27 by a wing nut 29, and the resulting angle of saw 19 with respect to table 12 may be read on scale 30.

Saw 19 and its shaft 18 are rotated by a pulley 31 which is connected by a belt 32 to a drive pulley 33 mounted directly on the shaft 34 of a motor 35. Said motor 35 is in turn mounted on a motor bracket 36 bolted to a hanger 37, the latter being pivotally supported at 38 from a pair of arms 39 formed on the end of a link 40 mounted on support 10 in a manner to be hereinafter described. The pivotal support 38 is disposed between and below the center of gravity of motor 35, bracket 36 and pulley 33 on the one hand, and pulley 31 on the other, so that the weight of the motor 35, bracket 36 and pulley 33 tends to keep belt 32 tight at all times.

The novel means for mounting link 40 on support 10 is shown more clearly in Figs. 3, 4 and 5. It is contemplated that motor 35 will not tilt with shaft 18 and hence the problem is to cause a lateral movement of drive pulley 33 in unison with the tilting of shaft 18 such that the drive sides of pulleys 31 and 33 are substantially aligned at all positions of shaft 18 and thus keep the belt on the pulleys. The means for accomplishing this movement comprises a parallelogram linkage which is in turn linked to plate 15 so that the parallelogram linkage is collapsed or distended as the shaft 18 is tilted or brought back to the horizontal.

Specifically, link 40 constitutes the horizontally movable link of the parallelogram as viewed in Figs. 3, 4 and 5, the other links comprising a fixed link 41 which may be fixed to or a part of support 10, and two side links 42 and 43 each of said links being pivoted to its adjacent link as at 44, 45, 46 and 47. Side link 43 has an extension 48 thereon to the free end of which is pivoted a connecting link 49, said link 49 being pivotally connected at its other end 50 to an arm 51 secured to plate 15 and acting as an extension thereof.

The operation of the mounting for effecting movement of link 40, i. e., for effecting movements of motor 35, is clearly shown in Fig. 5. It will be observed that as shaft 18 is tilted downwardly with respect to table 12, pulley 31 moves downwardly and has a lateral component of movement to the left as viewed in Fig. 5. The tilting of shaft 18 and its support plate 15 exerts a force on connecting link 49 to the left as viewed in Fig. 5, which force is transmitted to the end of extension 48 on side link 43, so that through the pivoting action of side link 43 on fixed link 41, the parallelogram linkage 41, 42, 40 and 43 is collapsed from the dotted position shown to the solid position, causing a lateral movement of link 40 and its associated motor 35 to the left in this figure. This lateral movement results in a movement of pulley 33 to the left in unison with the tilting of shaft 18, and the proportions of the links 40, 41, 42, 43, 48 and 49 and their relative disposition is such that the lateral displacement of the drive side of pulley 33 substantially equals the lateral displacement of the drive side of pulley 31 on shaft 18 at all permissible tilted positions of said shaft 18. This, of course, results in a continuous flow of power from pulley 33 to pulley 31 and obviates the use of special pulleys or adjusting mechanisms to accommodate the tilting of the saw 19 without a corresponding tilting of the motor 35 and its shaft 34.

Any change in the distance between pulleys 31 and 33 occasioned by the tilting of the saw or by raising or lowering the saw is automatically compensated for by the swinging of hanger 37 about its pivots 38 under the influence of the weight of motor 35.

It is understood that although the invention herein has been described with reference to a power tool having a saw as the cutting element, other cutting, forming or finishing elements may be substituted for the saw without affecting the operation of the invention. Thus, a dado, a shaper head or a disc sander can be substituted for the saw 19.

The foregoing description is merely illustrative of a preferred embodiment of this invention and the scope of this invention therefore is not to be limited thereto, but is to be determined by the appended claims.

What is claimed is:

1. A belt drive for power tools or the like, said drive comprising a source of power, a pulley driven by the source of power, a rotatable tool, a pulley secured to rotate with the tool, a belt connecting said pulleys, means for tilting the axis of rotation of the tool and the pulley secured thereto through a predetermined arc, a parallelogram support for the pulley driven by the source of power, said support being movable in planes parallel to the axis of rotation of the pulley driven by said source of power, and link means connecting the parallelogram support to the tilting means for compelling movement of the parallelogram support in unison with the tilting means to maintain the drive sides of both said pulleys in substantial alignment in all tilted positions of the axis of rotation of the tool.

2. A belt drive for power tools or the like, said drive comprising a source of power, a pulley driven by the source of power, a rotatable tool, a pulley secured to rotate with the tool, a belt connecting said pulleys, a frame for the power tool, a support for the rotatable tool, means pivoting the support on the frame for swinging the tool in a plane transverse to the axis of the tool, a support for the source of power comprising a parallel motion linkage having one link fixed to the frame, a link opposite the fixed link and means for securing the link opposite the fixed link to the power source, the linkage being movable in a plane parallel with the axis of rotation of the pulley driven by the source of power, and a link connecting the parallel motion linkage to the pivoted support for the tool, whereby to compel movement of the pulleys in unison to maintain the drive sides of both said pulleys in substantial alignment in all tilted positions of the axis of rotation of the tool.

3. A belt drive, as described in claim 2, said parallel motion linkage having side links connecting the fixed link and the link opposite said fixed link, and said link connecting the parallel motion linkage to the pivoted support for the tool comprisnig an extension on one of said side links.

4. A belt drive as described in claim 2, a bracket for supporting the source of power, said means for securing the link opposite the fixed link to the power source comprising pivoted means connecting the bracket to said link opposite the fixed link, the pivoted means being disposed between the center of gravity of the bracket and source of power supported thereby on the one hand and the axis of rotation of the rotatable tool on the other.

5. A belt drive as described in claim 2, the length of the link connecting the parallel motion linkage to the pivoted support being selected to cause substantially equal displacements of the pulleys in a direction parallel with the axis of the pulley driven by the power source.

6. In a table saw having a frame, a disc type saw, a table on the frame for supporting the workpiece, a tiltable support for the saw on the frame for swinging the saw relative to the plane of the table, a drive shaft for the saw mounted in the tiltable support, and a pulley secured to the shaft, means for driving the pulley comprising a motor, a pulley driven by the motor, a belt connecting both said pulleys, means mounting the motor on the frame for endwise movement of the motor relative to the frame, and means connecting the motor mounting to the tiltable support to compel movement of the motor in unison with the tiltable support, whereby to maintain substantial alignment between the drive sides of the pulleys for all positions of the tiltable support, said connecting means between the motor mounting and the tiltable support comprising a parallel linkage mechanism having one link fixed to the frame, a link opposite the fixed link secured to the motor, side links, and means connecting one side link to the tiltable support.

7. In a table saw having a frame, a disc type saw, a table on the frame for supporting the workpiece, a tiltable support for the saw on the frame for swinging the saw relative to the plane of the table, a drive shaft for the saw mounted in the tiltable support, and a pulley secured to the shaft, means for driving the pulley comprising a motor, a pulley driven by the motor, a belt connecting both said pulleys, means mounting the motor on the frame for endwise movement of the motor relative to the frame, and means connecting the motor mounting to the tiltable support to compel movement of the motor in unison with the tiltable support, whereby to maintain substantial alignment between the drive sides of the pulleys for all positions of the tiltable support, said connecting means between the motor mounting and the tiltable support comprising a parallel linkage mechanism having one link fixed to the frame, a link opposite the fixed link secured to the motor, side links, one side link extending beyond the said link opposite the fixed link, and a link connecting the extending end of said one side link to the tiltable support.

References Cited in the file of this patent
UNITED STATES PATENTS

| Number | Name | Date |
|---|---|---|
| 1,922,151 | Boice et al. | Aug. 15, 1933 |
| 2,590,035 | Pollack | Mar. 18, 1952 |
| 2,625,966 | Copp | Jan. 20, 1953 |
| 2,626,639 | Hess | Jan. 27, 1953 |